United States Patent [19]

Davis

[11] 4,265,355

[45] May 5, 1981

[54] CIGARETTE TAX STAMP APPLYING MACHINE AND METHOD

[75] Inventor: Allan C. Davis, Baltimore, Md.

[73] Assignee: The Meyercord Co., Carol Stream, Ill.

[21] Appl. No.: 970,256

[22] Filed: Dec. 18, 1978

[51] Int. Cl.[3] .............................................. B65G 47/26

[52] U.S. Cl. .................................... 198/427; 198/436; 53/50; 53/381 R

[58] Field of Search ........................ 198/418, 426-430, 198/434, 436-442, 445, 485, 601, 614, 457; 53/50, 381 R

[56] References Cited

U.S. PATENT DOCUMENTS

| | | | |
|---|---|---|---|
| 3,513,616 | 12/1967 | Davis | 53/381 R |
| 4,134,485 | 1/1979 | George | 198/434 |

*Primary Examiner*—Joseph E. Valenza

*Attorney, Agent, or Firm*—Merriam, Marshall & Bicknell

[57] ABSTRACT

This disclosure relates to a machine and method of applying cigarette tax stamps to cigarette packages in cartons. The machine includes an input platform or table that receives cartons from an infeed conveyor, and three incoming cartons are fed to three parallel channels. In each of the channels, the flaps of a carton are opened and folded upwardly and outwardly, thereby exposing the ends of the packages. Tax stamps are applied to the ends of the packages, glue is then applied to the outturned flaps, and the flaps are folded in again and resealed. The three channels are spaced laterally apart of the direction of movement of the cartons as they move through the channels. The cartons are pushed onto the input platform with their long dimension extending parallel to the channels. The carton movement is stopped by an end stop that is located to position the first, third and fifth cartons generally in line with the input ends of the three channels. The first, third and fifth cartons are then pushed into the three channels while the second, fourth and sixth cartons are held back, the three cartons being fed thereby being automatically spaced due to the presence of the two interleaving cartons. Switches are provided in the channels for detecting the flaps in their vertical positions after the flaps have been opened, to protect against a malfunction in the flap opening stage. Adjustments are provided for adjusting the machine to handle cartons of different lengths, different widths and different heights.

14 Claims, 25 Drawing Figures

88
87
86
5
3
94
91
43
93
97
96
92
71
11
10
9
8
7
6
4
2
82
267
42
30

8
6
2
43
71
11
10
9
7
4
42
267
30

88
87
86
43
30
71
11
10
9
8
7
6
5
4
3
2
1
82
42
267
40

43
30
71
11
10
9
8
7
6
4
2
82
42
267

CIGARETTE TAX STAMP APPLYING MACHINE AND METHOD

U.S. Pat. No. 3,068,622 and No. 3,513,616 disclose machines and processes for applying tax stamps to cigarette packages while the packages are in cartons. The machine shown in U.S. Pat. No. 3,068,622 is designed to be manually operated and to process one carton at a time. The machine and method disclosed in U.S. Pat. No. 3,513,616 is designed to operate automatically and to simultaneously process three cartons. In the machine disclosed in the latter patent, the cartons are fed into the machine and lined up on an input platform and the three endmost cartons in the lineup are pushed into three parallel channels. A separating mechanism is provided for separating or spreading the three endmost cartons apart before they are fed into the three channels. The carton flaps are folded open, cigarette tax stamps are applied to the cigarette packages and then the carton flaps are sealed again.

The latter is designed to process large quantities of cigarette cartons, and it is of course desirable to have the machine operate at as high a speed as possible while being reliable in operation. It is also desirable to have the machine adjustable so that it can handle different size cartons. In recent years, cigarettes of various lengths of thicknesses have been marketed, and cartons may vary in length, width or thickness from one brand to another.

It is a general object of the present invention to provide an improved machine and method for processing cigarette cartons at a higher speed, with increased reliability and with adjustments for cartons of different sizes.

Apparatus in accordance with the present invention comprises an input platform that receives a lineup of cigarette cartons in side-by-side relation, the cartons being oriented so that the cigarette packages are standing on end and the carton flaps are uppermost. The machine includes three parallel, laterally spaced channels. Alternate cartons in the lineup on the input platform are pushed into the channels, the three cartons being fed to the channels being spaced due to the interleaving cartons. Each of the channels includes apparatus for breaking the glue seal of the flaps, turning the carton flaps upwardly and then folding them outwardly. Each channel further includes feeler switches for sensing whether the carton flaps have been properly opened and folded, the feeler switches sensing the flaps when in the substantially vertical positions. The apparatus further includes mechanisms for adjusting the parts of the channels and of the infeed platform to accommodate cartons of different widths, lengths, and thicknesses.

The foregoing and other objects and advantages of the present invention will be better understood from the following detailed description taken in conjunction with the accompanying figures of the drawings, wherein.

Figure 9:
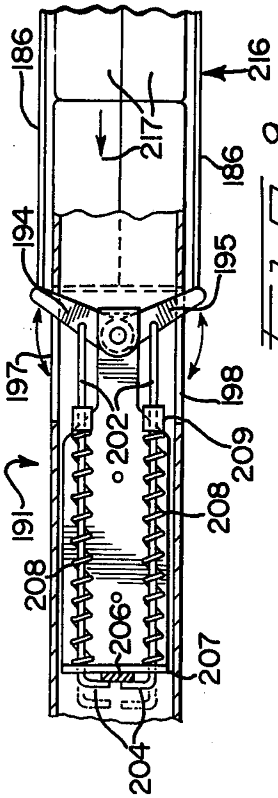
FIG. 9 is an enlarged fragmentary view taken on the line 9—9 of FIG. 8.
Figure 1:
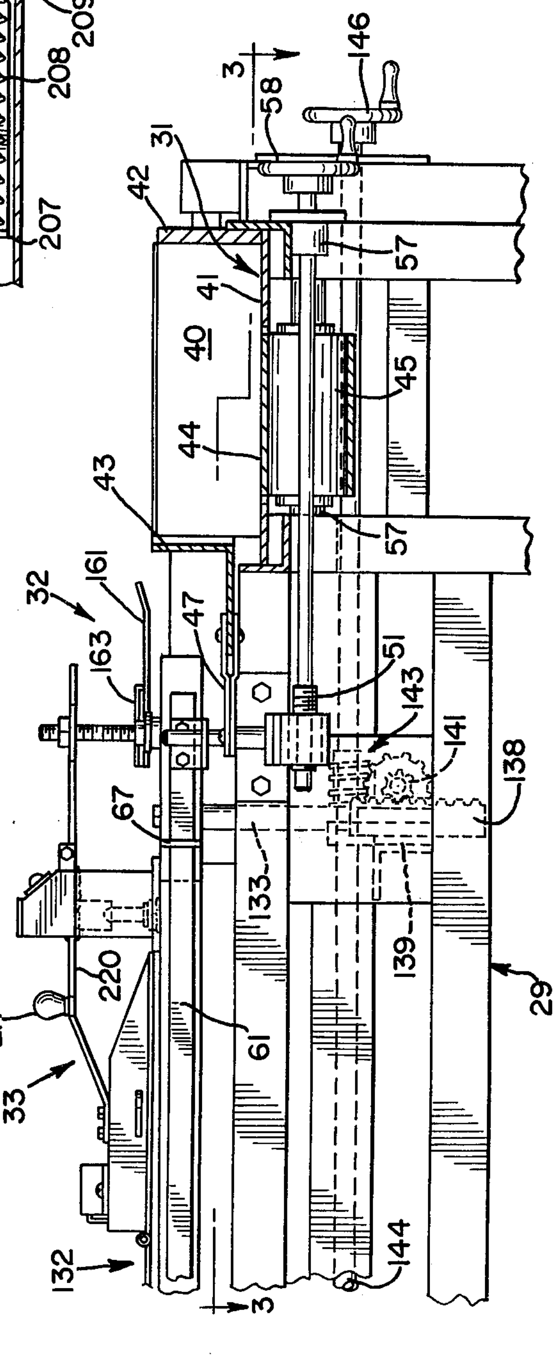
FIGS. 1 and 1A are fragmentary side elevational views of the machine.

With specific reference to FIGS. 1 through 4A, the machine comprises a frame 29 that supports the various operating parts of the machine, including an input platform or table 30 that receives incoming cigarette cartons 40 from an infeed conveyor 31, a carton separating stage 32, a carton flap opening stage 33, a carton flap fold back stage 34, a cigarette package stamping stage 35, and a carton flap regglueing stage 36.

Figure 2:
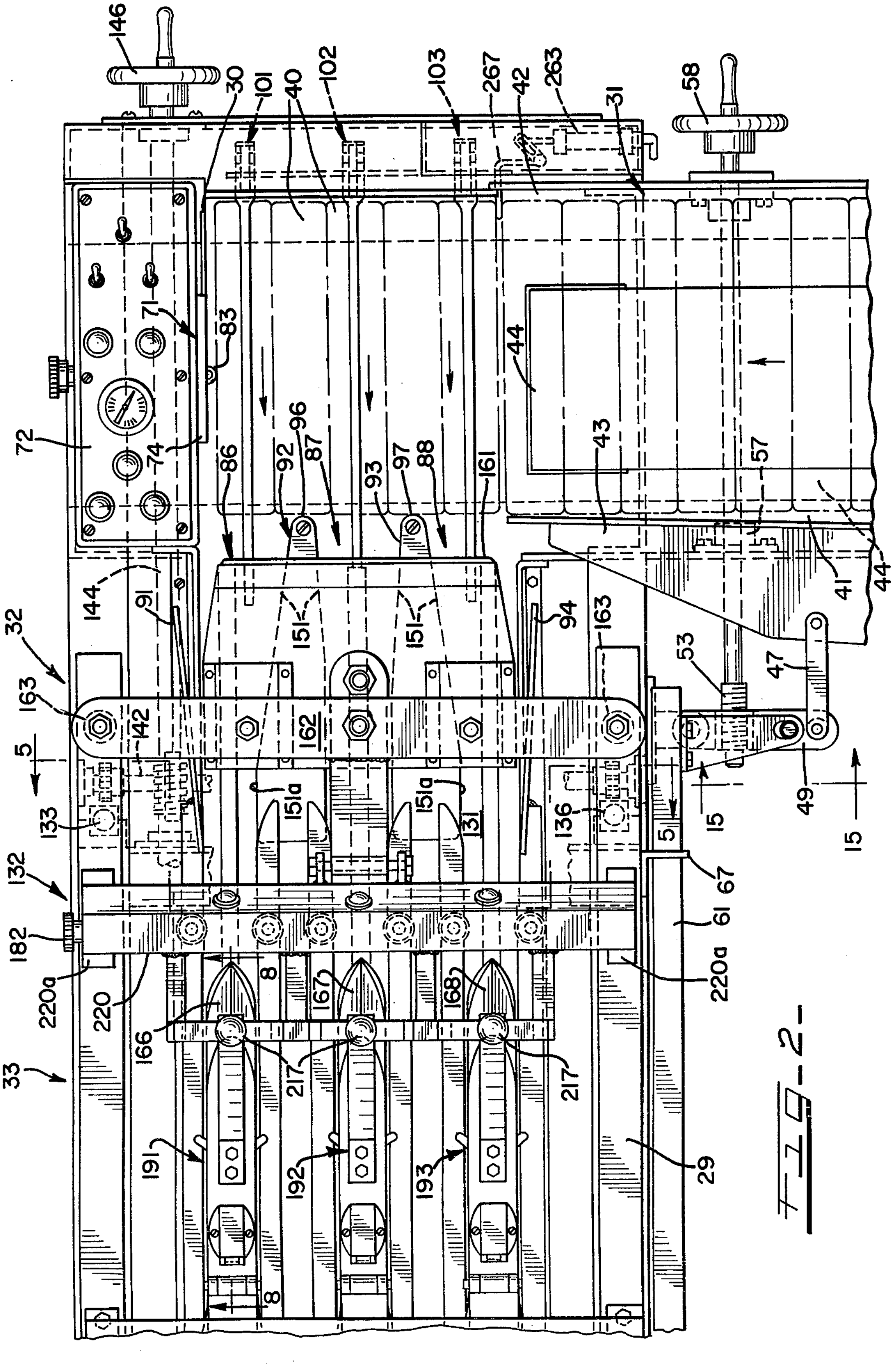
FIGS. 2 and 2A are fragmentary plan views of the machine shown in FIGS. 1 and 1A.

The infeed conveyor 31 comprises an elongated bed 41, side rails 42 and 43 and an endless belt 44. The cartons are positioned with their long dimension perpendicular to the length of the bed 44 and the side rails 42 and 43, and the distance between the side rails 42 and 43 is adjusted to be slightly greater than the length of cartons being processed. The cartons are fed by the infeed conveyor 31, from the bottom to the top of the page as seen in FIG. 2, and as mentioned above, the cartons are arranged with their long dimension extending laterally of the direction of movement. Further, the cartons are fed into the machine with the cigarette packages standing on end and with the glued flaps of the cartons uppermost. The bed 41 has a long opening formed in it that receives the belt 44. The belt is looped around two rollers 45 (FIG. 1) which normally drive the belt continuously during operation of the machine. The upper side of the belt 44 is substantially flush with the upper surface of the bed 41.

Figure 15:
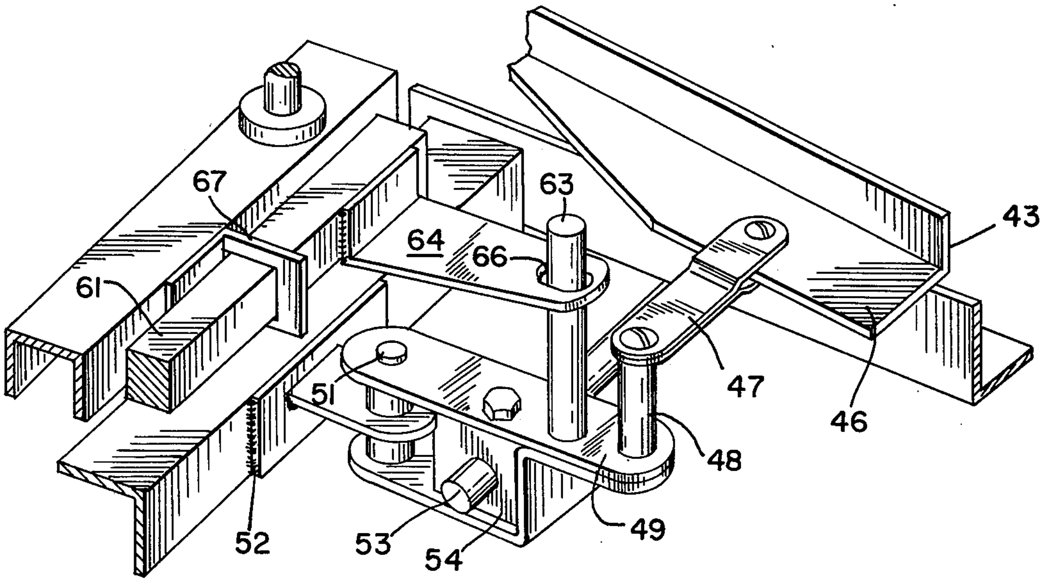
FIG. 15 is a perspective view showing an adjustment mechanism of the machine.

The mechanism for adjusting the position of the side rail 43 for different length cartons is best shown in FIGS. 2 and 15, and comprises a device for pivoting the upper end, as seen in FIG. 2, of the side rail 43 from left to right and vice versa. The lowermost end (not shown) of the side rail 43 is pivotally mounted on the frame of the machine. As shown in FIG. 15, the side rail 43 has a right angle shape in cross section, one of the sides of the angle being vertical and normally engaging the ends of the cigarette cartons on the bed 41. The horizontal arm 46 of the side rail 43 is attached to a link 47 (FIG. 15) which is pivotally connected both to the arm 46 and to a pivot pin 48. The pin 48 is supported on the outer end of an arm 49, the other end of the arm 49 being pivotally supported by a pivot pin 51 on a frame member 52 of the machine. To pivot the arm 49 in a horizontal plane, a screw mechanism is provided including a threaded shaft 53 and an engaging nut 54 which is secured to the arm 49. The threaded shaft 53 extends from the nut 54 in the direction of the front of the machine, the front being the location where the machine operator normally stands and is on the right side of the machine as seen in FIGS. 1 through 4A. The shaft 53 is supported by the nut 54 and by bearings 57 on the frame 56 of the machine, and it extends underneath the side rails 42 and 43 and between the upper and lower sides of the feed belt 44, this arrangement being best shown in FIG. 1. A hand wheel 58 is connected to the front end of the shaft 53. With reference to FIG. 15, when the shaft 53 turns, as by turning the hand wheel 58, the nut 54 is moved axially of the shaft 53. This causes the arm 49 to pivot on the pin 51, and the pin 48 and the link 47 swing in an arc about the pin 51. Consequently, the side rail 43 may be moved by an operator standing at the front of the machine in order to adjust the distance between the two side rails 42 and 43.

Figure 2A:
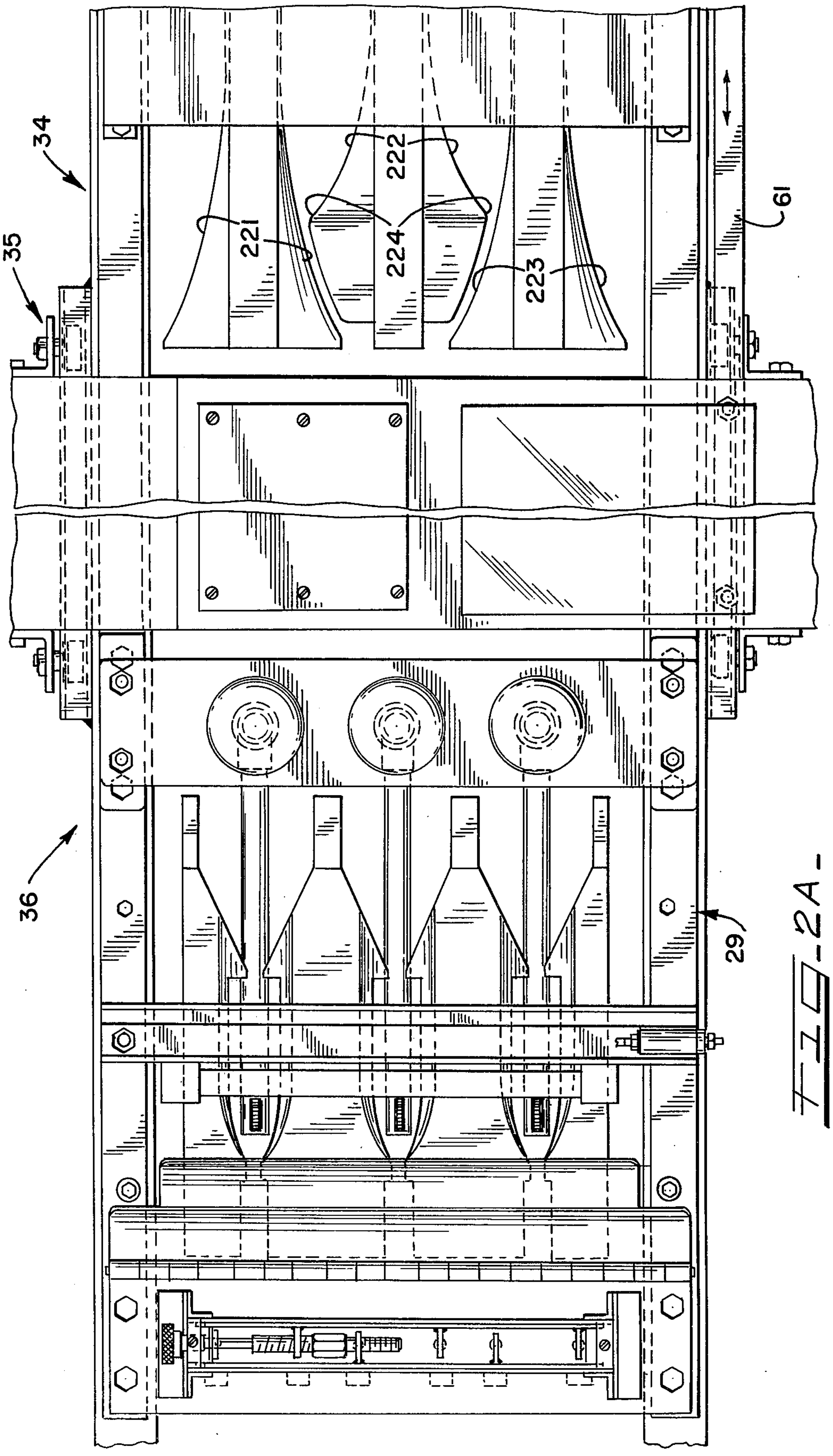

Since the location of the stamping stage 35 should also be adjusted for different carton lengths, the handwheel 58 may be connected to move both the rail 43 and the stage 35. A bar 61 is connected between the stamping stage 35 and the arm (FIG. 15), the bar 61 (FIGS. 2. and 2A) having its left hand end, as seen in FIGS. 2 and 2A, connected to the stamping stage 35 by couplings 62 and its right hand end connected to the arm 49 by vertical pin 63 and a link 64. The link 64 is secured by welding to the forward end of the bar 61 and has an enlarged slot 66 formed in its outer end which receives the pin 63. The pin 63 is secured to the arm 49 as previously mentioned and when the arm 49 swings about the axis of the pin 51, the pin 63 also swings on the pin 51 axis and moves the bar 61 in either the forward or rearward direction depending upon the direction of rotation of the shaft 53. The bar 61 is slidably mounted in a plurality of guides 67.

Figures 18, 19, 20, 21:
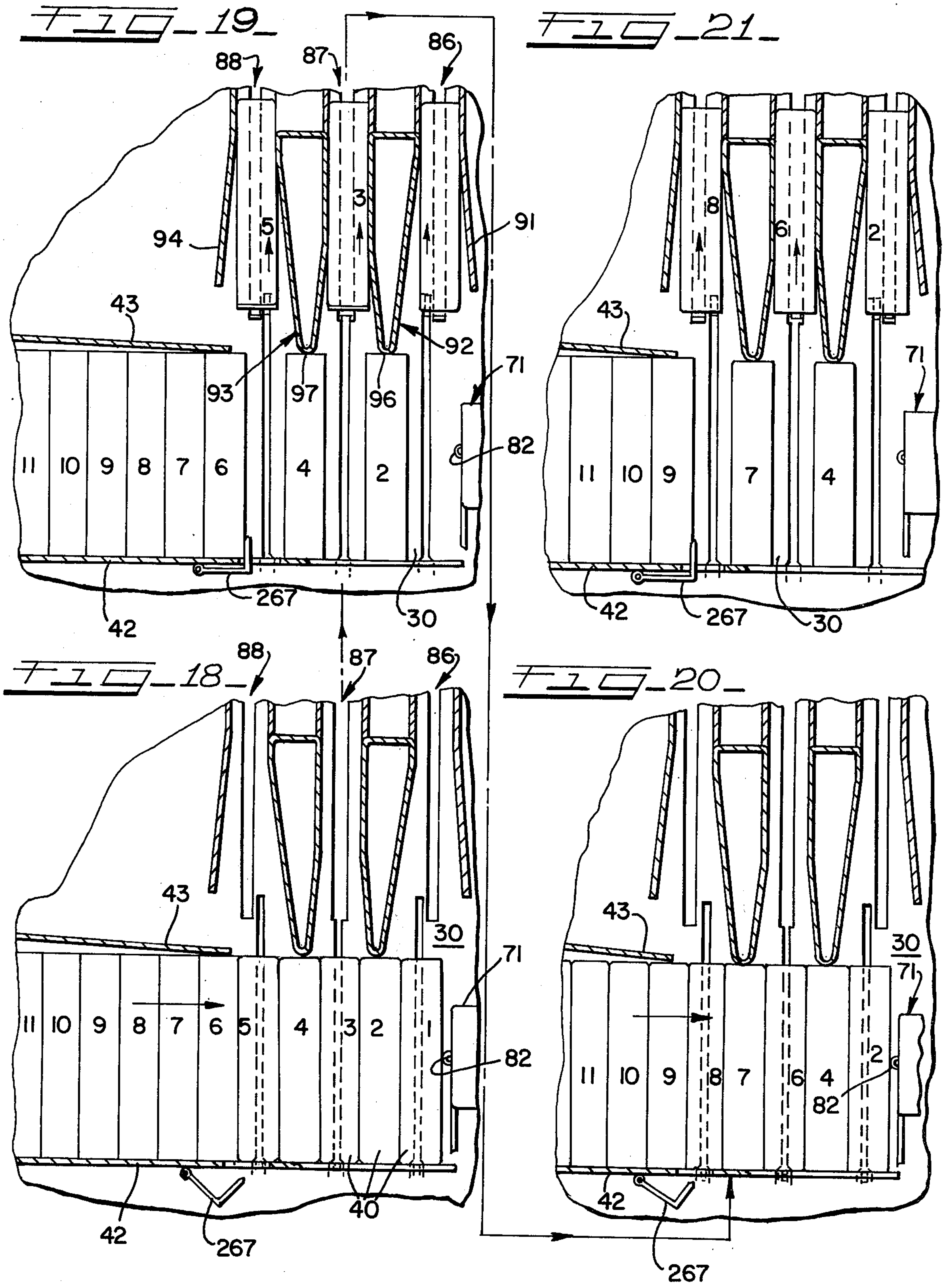
FIGS. 18 through 21 are diagrammatic views showing the sequence of steps in feeding cartons into the machine.

The input platform 30 is located at the end of the bed 41 and the feedbelt 44, and it may be formed from the same section or sheet that forms the bed 41. The side rail 43 terminates at approximately the point where the belt 44 ends and the input platform 30 begins, and the distances from the end of the side rail 43 to a stop block 71 is substantially equal to the overall width of five cigarette cartons. This spacing is best illustrated in FIGS. 2 and 18. At the forward end of the platform 30, which is the end toward which the cartons 40 are moved by the belt 44, is mounted an instrument and control panel 72. The stop block 71 is movably mounted on the frame of the machine adjacent the panel 72, and the position of the stop block 71 may be adjusted relative to the panel 72 by a mechanism illustrated in detail in FIG. 10. First with reference to FIGS. 3 and 4, the stop block 71 comprises an elongated strip 73 that extends across the forward end of the input platform 30. The panel 72 is supported by a housing 74 (FIG. 10) on the frame of the machine, the housing 74 having an opening 76 formed in it, and the strip 73 is supported by an arm 75 that extends through the opening 76. On the underside of the arm 75 is secured a nut 77, and an adjusting screw 78 is screwed into the nut and it has a knob 79 that extends from the forward side of the machine. The screw 78 is held against axial movement on the frame of the machine by any suitable means such as a device 81, and when the knob 79 is turned the nut 77 and the arm 75 move axially on the screw 78. Thus the position of the stop 71 is adjusted either toward or away from the infeed conveyor belt 44 depending upon the direction of turning of the knob 79.

Figures 3, 10:
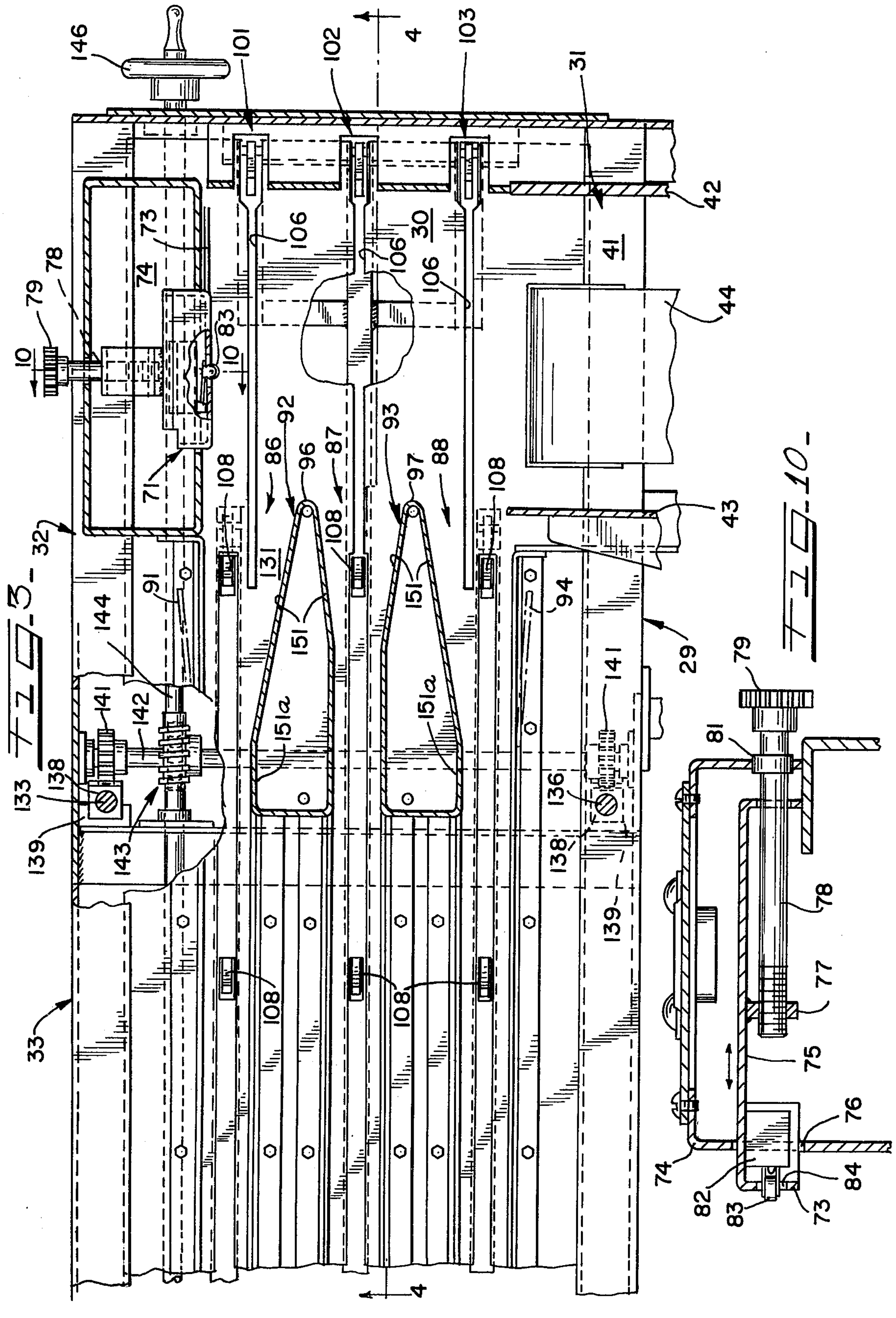
FIGS. 3 and 3A are views partially in section taken on lines 3—3 and 3A—3A of FIGS. 1 and 1A.
FIG. 10 is an enlarged fragmentary sectional view taken on the line 10—10 of FIG. 3.

The stop 71 supports a switch 82. The body of the switch 82 is mounted behind the strip 73 and a feeler or lever 83 of the switch 82 extends through a small opening 84 formed in the strip 73. As best shown in FIGS. 2 and 3, the feeler 83 normally extends out of the opening 84. When the input platform 30 has five cartons on it and additional cartons are present on the belt 44, the pressure in the forward direction exerted by the cartons by the belt on the cartons on the platform 30 pushes the feeler 82 in and actuates the switch 82. Thus, the presence of a full compliment of cigarette cartons on the infeed table 30 is sensed and when the switch 82 is actuated, a series of feeding operations is commenced as will be described hereinafter. The purpose of the adjustment of the stop 71 will be described later.

The stages 32, 33, 34, 35 and 36 of the machine include three parallel channels so that three lines of cartons may be simultaneously processed or operated upon by the machine. The three channels are indicated by the reference numbers 86, 87 and 88 in the drawings. Prior to the operation of the machine, the machine operator adjusts the screw 78 connected to the stop 71 so that the center carton of the five cartons on the platform 30 is substantially aligned with the center channel 87. This adjustment is illustrated in FIGS. 2 and 18. As previously mentioned, different brands of cigarettes differ in their width and therefore the machine operator may have to make an adjustment of the position of the stop 71 before processing a particular brand of cigarettes.

In the separator stage 32, the channel 86 is formed between a forward side plate 91 (FIG. 2) and a separator 92, the channel 87 is formed between the separator 92 and another separator 93, and the third channel 88 is formed between the separator 93 and a rearward side plate 94. For the purpose of this description, the carton engaging the feeler of the switch 82 is considered the number 1 carton, the next adjacent carton is No. 2, etc. When the stop 71 is properly adjusted, there are five cartons on the platform 30, the number 1 carton is aligned with the channel 86, the number 2 carton is aligned with the forward end 96 of the separator 92, the carton number 3 is aligned with the channel 87, the number 4 carton is aligned with the forward end 97 of the separator 93, the number five carton is aligned with the channel 88, and the cartons from number six on are behind the side rail 43. This situation is illustrated in FIGS. 2 and 18.

Figure 4:
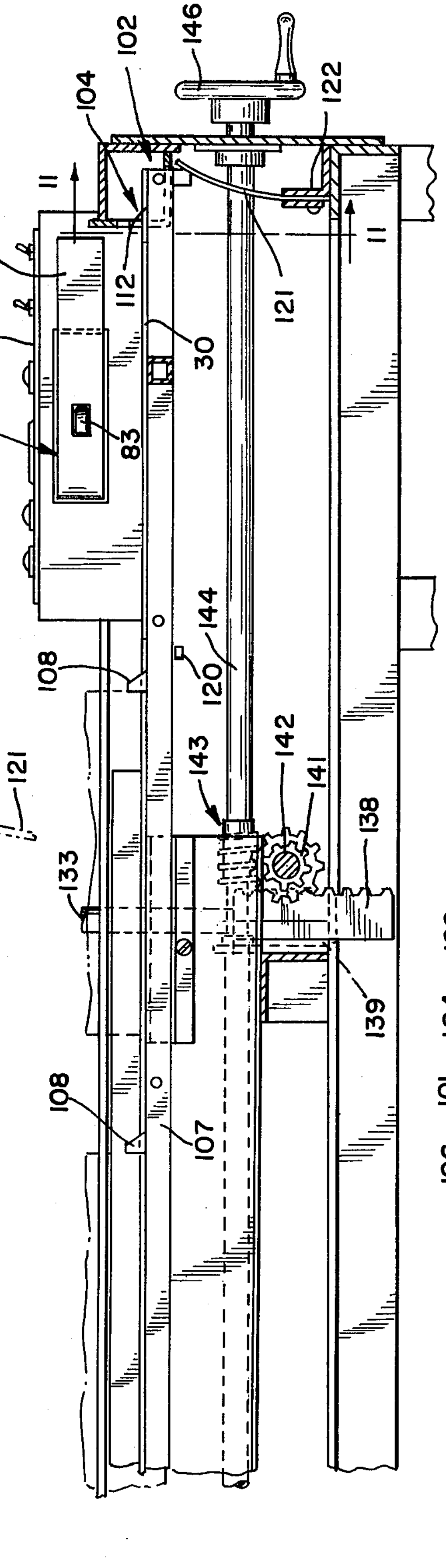
FIGS. 4 and 4A are fragmentary views partially in section taken on the lines 4—4 and 4A—4A of FIGS. 3 and 3A.
Figure 12:
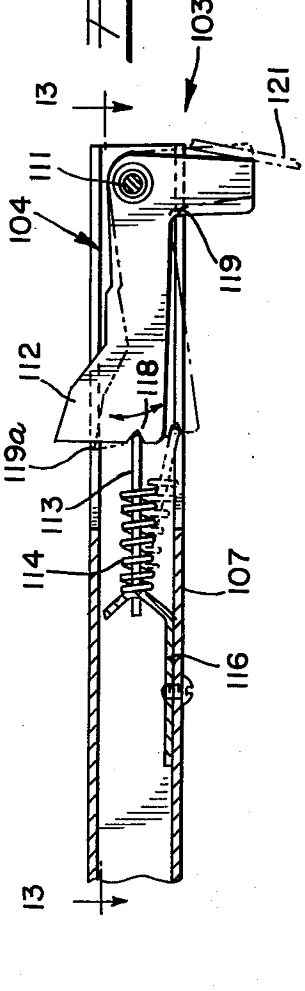
FIG. 12 is a fragmentary enlarged view taken on the line 12—12 of FIG. 11.
Figure 13:
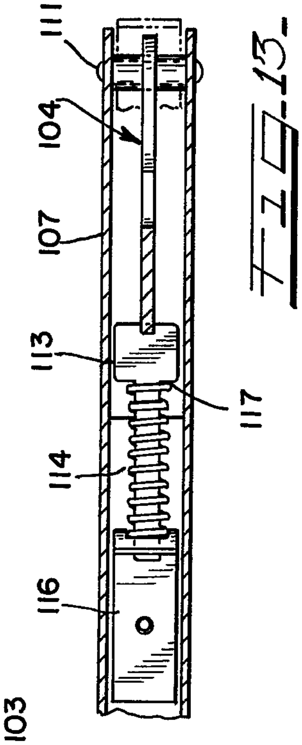
FIG. 13 is a fragmentary view taken on the line 13—13 of FIG. 12.

Cartons numbers one, three and five are moved from the platform 30 and into the three channels 86, 87, and 88 by three pusher mechanisms 101, 102 and 103 (FIG. 3). Each of the pusher mechanisms comprises a dog 104 (FIGS. 11 through 13) that is mounted for movement across the platform 30 and in the direction of the three channels. Each dog 104 moves in an elongated slot 106, FIG. 3, formed in a plate-like bed or table 131 of the stages. The slots 106 are parallel to the long dimension of the cartons on the platform 30 and parallel to the channels 86, 87 and 88, the slots 106 extending from the front side of the platform 30 and into the front ends of the three channels 86, 87 and 88. As shown in FIGS. 12 and 13, each of the dogs 104 is pivotally mounted on the front end of an elongated link 107 that is mounted underneath the associated slot 106 and is movable parallel to the direction of the slot 106. The links 107 extend under the bed 131 for the length of the five stages 32–35 and under the platform 30. When the links 107 are at the frontmost end of their travel, which is the position illustrated in FIGS. 3 and 4, the three dogs 104 are adjacent the front edge of the platform 30. During the cycling of the machine, the three dogs 104 are moved through the associated slots 106 toward the left as seen in FIGS. 1 to 4, the dogs extending above the upper surface of the platform 30 and the bed 131. The three dogs engage the right hand or front ends of the cartons in the channels 86, 87 and 88. On the return stroke of the links 107 and the dogs 104, the dogs 104 are retracted below the upper surface of the platform 30 but when the dogs 104 again reach their frontmost positions, the three dogs 104 are snapped to their raised positions in readiness for the next cycle of operation. As shown in FIG. 4, additional sets of dogs 108 are fastened to the three links 107, one set being provided for each of the five stages 32 to 36, all of the dogs 104 and 108 then being moved in synchronism to simultaneously push the cartons through the stages as the links 107 are moved.

Figure 11:
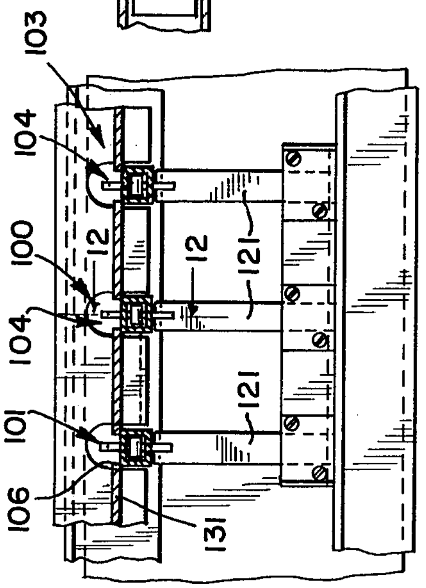
FIG. 11 is a fragmentary view showing a mechanism for feeding cartons through the machine.

With reference to FIGS. 11, 12 and 13, the links 107 are U-channel shaped, and each of the dogs 104 is mounted on the link 107 associated with it by a pivot pin 111. The link 104 has the shape of the letter L and the pin 111 is located at the corner of the L shape. From the pin 111, the longer arm of the dog 104 extends horizontally and is flared upwardly at the left hand end in the area indicated by the numeral 112, At the flared end is provided a catch mechanism comprising a catch 113 and a compression spring 114 that are supported by a brace 116 mounted on the link 107 within the opening of the channel. The catch 113 is movable in a slot formed in the brace 116 and the spring 114 is positioned between the brace 116 and a shoulder 117 (FIG. 13) formed on the catch 113. The spring 114 urges the catch 113 in the right hand direction as seen in FIG. 13, and the right end of the catch 113 fits in a notch 118 formed in adjacent end of the dog 104. This arrangement forms a two-position over-center type of device. When the dog 104 is pivoted counterclockwise direction to the dash-dot position shown in FIG. 12, the notch 118 is below a line drawn from the pin 111 to the hole in the brace 116, and when the dog 104 is pivoted clockwise to the solid line position the notch 118 is above this line. In both positions, the dog 104 engages stop surfaces formed on the link 107 which limit the movement of the dog, the stop surfaces being indicated by the reference numerals 119 and 119A.

When the links 107 of the three pusher mechanisms 101, 102 and 103 are moved toward the left as seen in FIGS. 3 and 12, the dogs 104 are in the raised or solid line position shown in FIG. 12. The flared portions 112 of the dogs extend above the upper surface of the platform 30 and engage the front ends of the cartons numbers 1, 3 and 5 and move them toward the left end into the three channels 86, 87 and 88. When the dogs 104 reach approximately the left hand ends of the three slots 106, the downwardly extending arms of the dogs 104 engage a cross bar 120 (FIG. 4) which pivots the dogs in the clockwise direction. The drive mechanism to be described hereinafter stops the leftward movement of the three links and then moves the three links back toward the right. When the three dogs 104 move toward the right, the flared ends 112 are retracted because dogs 104 have been pivoted. When the links 107 return to the right or frontmost positions, a leaf 121 (FIGS. 4, 11 and 12) mounted by a bracket 122 on the frame of the machine below the pusher mechanisms, engages the downwardly extending arm of each dog 104. The frontward movement of the dogs causes the leafs 121 to exert pressure on the dogs as they flex, which causes the dogs to snap in the clockwise direction to the raised position in readiness for the next cycle.

Figure 3A:
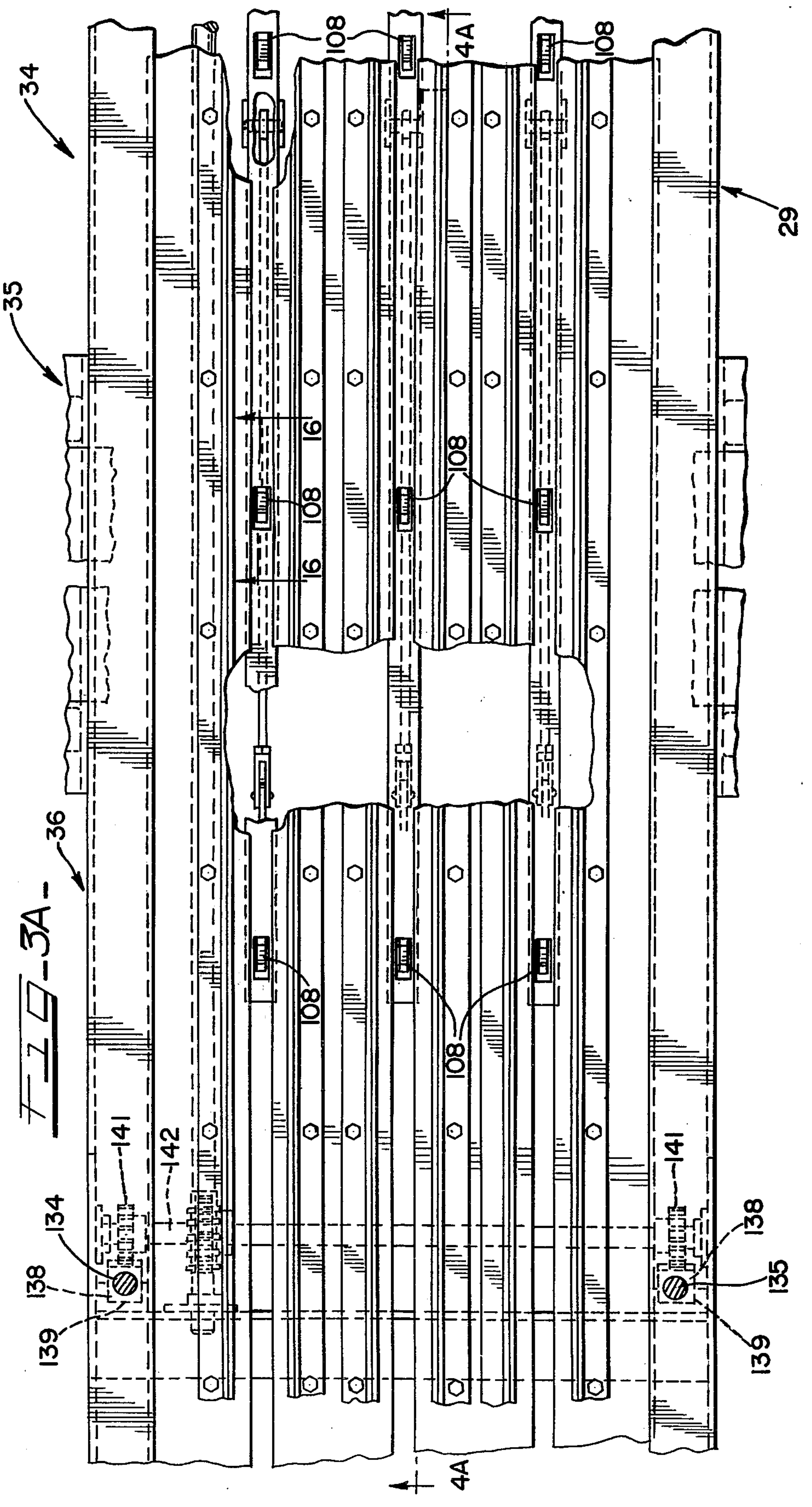

In the part of the machine including the four stages 33 to 36 is provided a rack or carriage 132 that is mounted on the frame of the machine above the bed 131, the rectangular carriage 132 supporting the operating parts of the five stages. The carriage 132 is supported at its four corners on the main frame of the machine by four vertical columns or posts 133, 134, 135 and 136 (FIGS. 3 and 3A), posts 133 and 136 being at the end of the machine which is adjacent the separator stage 32 and the other two posts 134 and 135 being at the end of the machine which is adjacent the regluing stage 36. The posts 133 through 136 are secured to rack sections 138 (FIGS. 4 and 4A) which are vertically movable in support channels 139. Each rack section 138 engages a pinion 141 that is mounted on an end of a horizontal shaft 142 (FIGS. 3, 3A, 4, and 5), the two shafts 142 extending laterally of the machine.

The two shafts 142 are further coupled by a worm-pinion connection 143 to a long shaft 144 that extends to the front of the machine and connects to a handwheel 146, and it will be apparent that by turning the handwheel 146, the shaft 144 and the worm pinion connections 143 will cause the four posts 133 to move up or down on the frame 29. Thus the vertical height of the carriage 132 above the bed 131 may be adjusted to accommodate cartons of different heights, as previously mentioned.

In the separator stage 32, the two separators 92 and 93 and the two side plates 91 and 94 are fastened to the bed 131 by suitable braces and screws. The distances between the side plates 91 and 94 and the adjacent sides of the separators 92 and 93 are slightly greater than the maximum thickness of the cartons to be processed, and similarly the distances between the adjacent sides of the two separators 92 and 93 is also slightly greater than the maximum thickness of the cartons. The two side plates 91 and 94 extend vertically and generally parallel to the direction of movement of the cartons as they are pushed through the three channels. The two separators 92 and 93 each have slanted side walls 151 which merge at the narrow rounded front ends 96 and 97, the rounded ends 96 and 97 being generally aligned with the cigarette cartons No. 2 and No. 4 as indicated in FIGS. 2 and 18. The side 151 of the separator 92, which is adjacent the side plate 91 makes a relatively large angle relative to the plate 91 and to the direction of movement of the cartons, and consequently the entrance end of the channel 86 is relatively wide. Similarly, the side 151 of the separator 93, which is adjacent the side plate 94 also makes a relatively large angle relative to the direction of movement of the cartons and to the plate 94, thereby producing a wide entrance opening for the channel 88. The adjacent sides 151 of the two separators 92 and 93 are not as sharply angled, but a wide entrance opening for the channel 87 is not necessary because the cigarette carton No. 3 is normally directly in line with the channel 87.

From FIGS. 3 and 18 to 20, it will be noted that each of the two separators 92 and 93 extends into the space between two of the slots 106 in the platform 30. The slots 106 associated with the channels 86 and 88 extend into the entrances of the channels 86 and 88, and the center slot 106 is substantially lined up with the center line of the channel 87. When the pusher mechanisms 101, 102 and 103 move toward the left as seen in FIGS. 1 through 4A, they push the cartons No. 1, No. 3 and No. 5 toward the left. The No. 1 carton and the No. 5 carton engage the adjacent sides 151 of the two separators 92 and 93, causing these two cartons to angle outwardly toward the side walls or plates 91 and 94. The slanted sides 151 of the separators 92 and 93 merge into straight portions 151*a* which extend parallel to the side plates 91 and 94 and to the centerlines of the channels. The cartons in the channels 86 and 88 are straightened out by these straight wall portions as the pusher mechanisms 101 and 103 push the cartons into these channels as illustrated in FIG. 19.

It is preferred that a lid or cover 161 (FIG. 1) be provided as part of the separator stage to prevent the cartons that are being fed into the three channels from tilting upwardly. The lid 161 extends across the upper sides of the two separators 92 and 93 and covers the entrances of the three channels 86 to 88. The lid 161 is secured to a crossbar 162 that extends laterally of the machine above the separators, the crossbar being secured at 163 to the right hand end of the carriage 132 (see FIG. 2). Since the lid 161 is mounted on the carriage 132, it will of course be vertically adjusted when the carriage is adjusted for the different size cartons. The cartons are moved underneath the lid 161 as they are being pushed into the three channels, and as previously mentioned the lid prevents the cartons from being tipped upwardly as they are pushed by the pusher mechanism and straightened out by the side walls.

Figure 6:
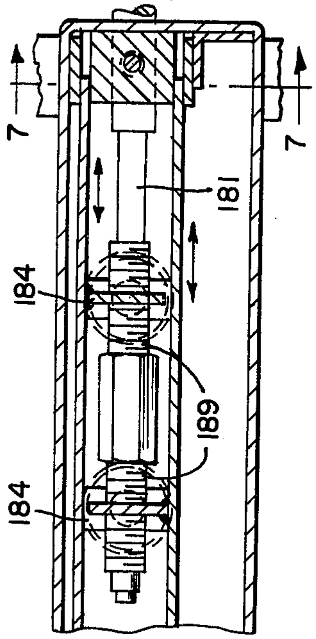
FIG. 6 is a fragmentary sectional view taken on the line 6—6 of FIG. 5.
Figure 7:
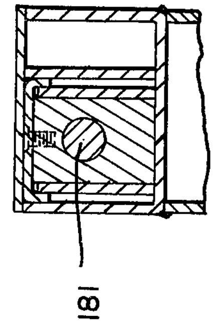
FIG. 7 is a fragmentary sectional view taken on line 707 of FIG. 6.
Figure 5:
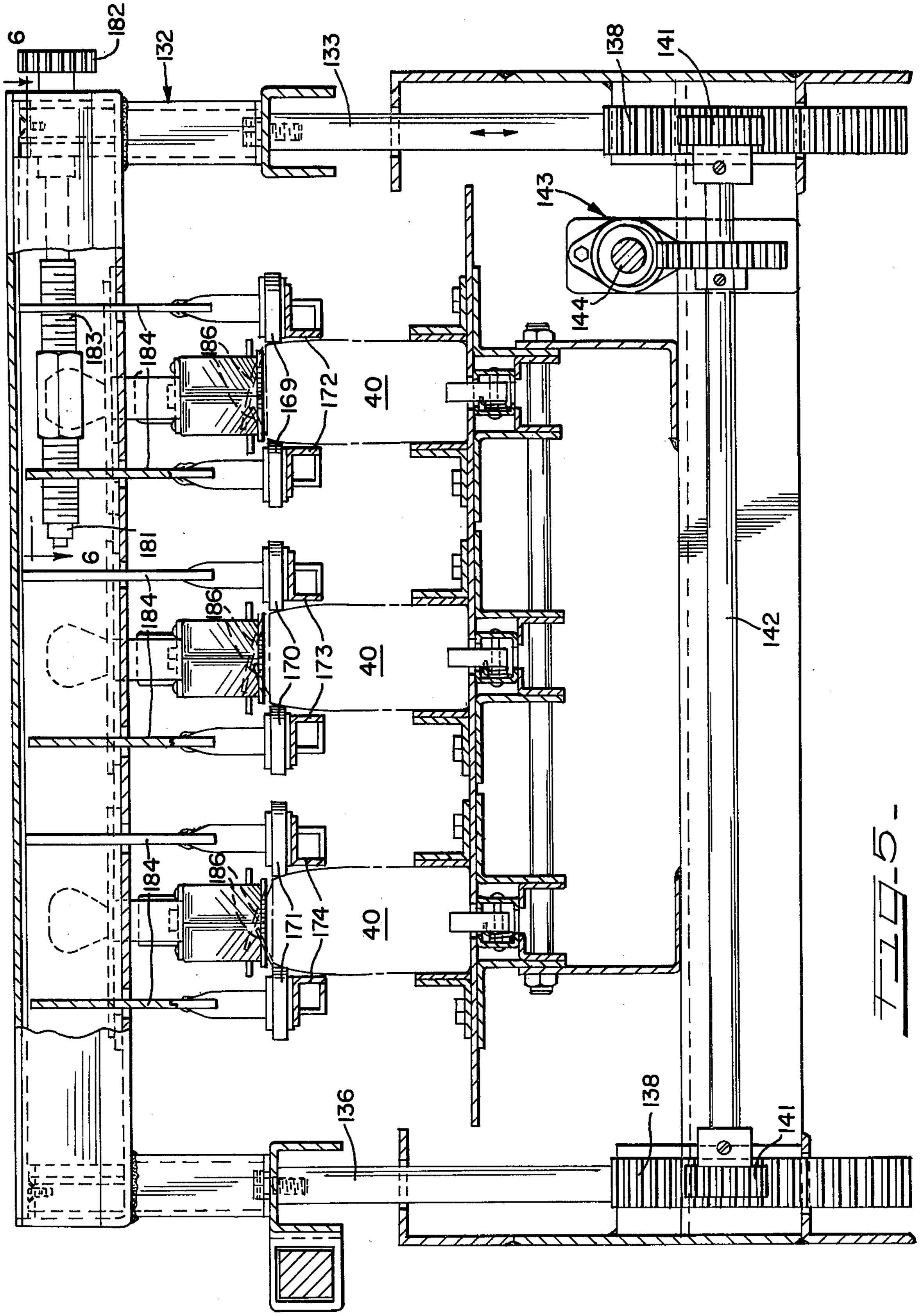
FIG. 5 is a further enlarged sectional view taken on the line 5—5 of FIG. 2.

The parts of the flap opener stage 33 are also supported by the carriage 132, and this stage includes three flap opening horns 166, 167, and 168 which are associated with the three channels 86, 87, and 88, respectively. The configuration and operation of the horns is generally similar to the corresponding parts disclosed in U.S. Pat. No. 3,513,616 and therefore will not be discussed in detail herein. Forwardly of the three horns are pairs 169, 170 and 171 of pressure rollers which are supported on laterally adjustable guides 172, 173 and 174, a guide and pressure roller being at each side of each of the channels and the rollers being just ahead of the right end of the horns. With reference to FIG. 5, the pair of guides and rollers for each channel are mounted for movement laterally of the machine in order to accommodate cartons of different thicknesses. A laterally extending shaft 181 is mounted on the carriage 132 above the guides 172 to 174, and a knob 182 (FIGS. 2 and 5) is fastened to one end of the shaft 181. The shaft 181 has a pair of reversely threaded screws 183 fastened to it for each pair of the guides 172, 173 and 174, and the guides are fastened by braces 184 to the screws 183. Threaded connections between the braces 184 and the reversely threaded screws in (FIGS. 5 and 6) cause the braces 184 either to move laterally closer together or to move apart as the knob 182 and the shaft 181 are turned. Such lateral movement of the braces 184 of course also moves the guides and the pairs of rollers 169, 170 and 171. As best shown in FIG. 5, the lateral separation of the rollers of each pair is adjusted so that the rollers squeeze the upper ends of the cartons moving through the three channels toward the horns 166 to 168, causing the upper ends of the cartons to bulge upwardly slightly. The carton flaps on the upper sides of the cartons, indicated by the reference numerals 186 in FIG. 5, are bowed upwardly, and the vertical position of the carriage is adjusted to cause the shoes 166, 167 and 168 to extend underneath the bowed flaps and to spread the flaps upwardly, as described in more detail in U.S. Pat. No. 3,513,616.

A switch arrangement is also associated with each of the shoes to sense whether the cartons flaps 186 have been opened by the shoes 166 to 168, and the switches are designed to sense both flaps of each carton when the flaps are in substantially vertical positions. If either of the flaps 186 of a carton has not been turned upwardly, the associated switch is not actuated and the operation of the machine is stopped. In a machine wherein the three channels are relatively close together, it may be preferable to have the switches sense the carton flaps in the vertical position as disclosed herein, as distinguished from sensing the flaps in a horizontal position as in the prior art because, where the channels and the cartons are close together, a flap of one carton may extend across to an adjacent channel and actuate a switch associated with the adjacent carton if the flaps are folded back horizontally.

Figure 8:
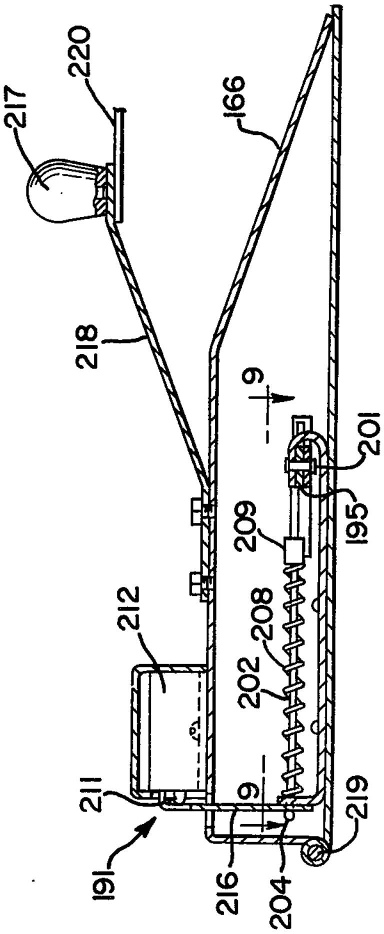
FIG. 8 is a fragmentary enlarged sectional view taken on the line 8—8 of FIG. 2.

With reference to FIGS. 8 and 9, switches 191, 192 and 193 are associated with the three channels 86, 87, and 88, and switch 191 is illustrated in more detail. Each of the switches comprises a pair of sensor fingers 194 and 195 (FIG. 9) which extend through slots 197 and 198, respectively, formed in the vertical sides of a switch housing 199. Each of the fingers 194 and 195 has one end that is pivotally mounted on a vertically extending pivot pin 201 which is supported on the housing 199. Between the ends of each finger is a link 202 that has one end looped through a hole formed in the finger, the other end 204 of each link 202 is bent inwardly and overlies flexible or pivotable leaf 206. The two links 202 of each switch extend through holes formed in a support 207 of the switch housing 199 and a compression spring 208 is positioned around each link and between the support 207 and a collar 209 secured to the link. The two springs 208 urge the collars 209 and the links 202 toward the right as seen in FIGS. 8 and 9. In the right most positions of the two fingers 194 and 195, which is shown in FIG. 9, the ends 204 of the two links 202 move the leaf 206 toward the right. When the outer ends of the two fingers 194 and 195 move toward the left as shown by the dashed line in FIG. 9, the links 202 also move leftward and their ends 204 disengage the leaf 206.

With reference to FIG. 8, the upper end of the leaf 206 is movable to engage the button 211 of an electric switch 212 and actuate the switch. The leaf 206 is pivotally mounted at its upper end above the button 211, and the leaf 206 extends downwardly across the leaf 206 and to the two links 202. FIG. 9 illustrates the situation where two flaps 186 of a cigarette carton 216 extend vertically and the carton is being pushed toward the left and against the outer ends of the two fingers 194 and 195. The numeral 217 in FIG. 9 indicates a number of cigarette packages within the carton 216. When the carton 216 is pushed toward the left, the two vertical flaps 186 engage the outer ends of the two fingers 194 and 195 and swing them toward the left and about the pivot pin 201. The two links 202 also move toward the left, and this permits the leaf 206 to flex or pivot and to disengage the button 211 of the switch 212. However, if only one of the two flaps 186 or if neither of the flaps, is vertically oriented, one or both of the two links 202 will continue to engage the leaf 206 and the leaf 206 will be held against the switch button 211.

If one of the three switches 191, 192 or 193 is not actuated when three cartons are pushed through the flap opening stage 33, the operation of the machine will be stopped, the switches being connected in the control circuit of the drive motor. To restart the machine, the operator lifts the three horns 166, 167 and 168 by picking up one of the three knobs 217 (FIGS. 1, 2 and 8) fastened by arms 218 to the horns. The horns are pivotally mounted at 219 on the carriage. A cross member 220 is fastened to the arms 218 and it normally rests on supports 220*a* at the sides of the carriage. After the jam is repaired by lifting the flaps of the cartons, the horns are returned to their operating positions, the three switches 191, 192 and 193 are actuated, and the machine is restarted.

From the flap opening stage 33, the cartons are pushed through a carton flap fold back stage 34 which again may be generally similar to the corresponding parts described in U.S. Pat. No. 3,513,616. The present construction is different, however, in that the fold back device for the center channel 87 folds the flaps of the center carton before or ahead of flaps of the cartons in Channels 86 and 88. The purpose is to cause the flaps of the center carton to fold back first and then the flaps of the two outermost to fold back over the flaps of the center carton. Therefore, the three channels may be located relatively close together. Where the channels are relatively close together, the provision of the switches 191 to 193 that sense the flaps when in their vertical positions in advantageous. If the flaps were folded back and overlap each other while in the opening stage 33, it would be difficult to detect whether a particular flap has been opened if the detectors sense the horizontal orientation of the flaps. The flap fold back device (FIG. 2A) for the center channel 87 comprises two curved surfaces 221, the foldback device for the channel 86 comprises two curved surfaces 222 and the flap fold back device for the channel 88 includes two curved surfaces 223. It will be noted from FIG. 2A that the two surfaces 221 of the center channel 88 are located to fold back the flaps of the carton in this channel ahead of the fold back of the flaps of the two outermost cartons. At approximately the point 224, the two flaps of the center carton will be completely folded back and at this point, the adjacent flaps of the two outer cartons start to be turned back. When the three cartons have been pushed through the stage 34, all of the flaps extend substantially horizontally, and the flaps of the carton in the center channel extend underneath the adjacent flaps of the cartons in the two outer channels.

The construction and operation of the stamping stage 35 and the reglueing stage 36 may be similar to the corresponding stages of the machine described in U.S. Pat. No. 3,513,616, and therefore, they will not be described further herein.

Figures 1A, 14:
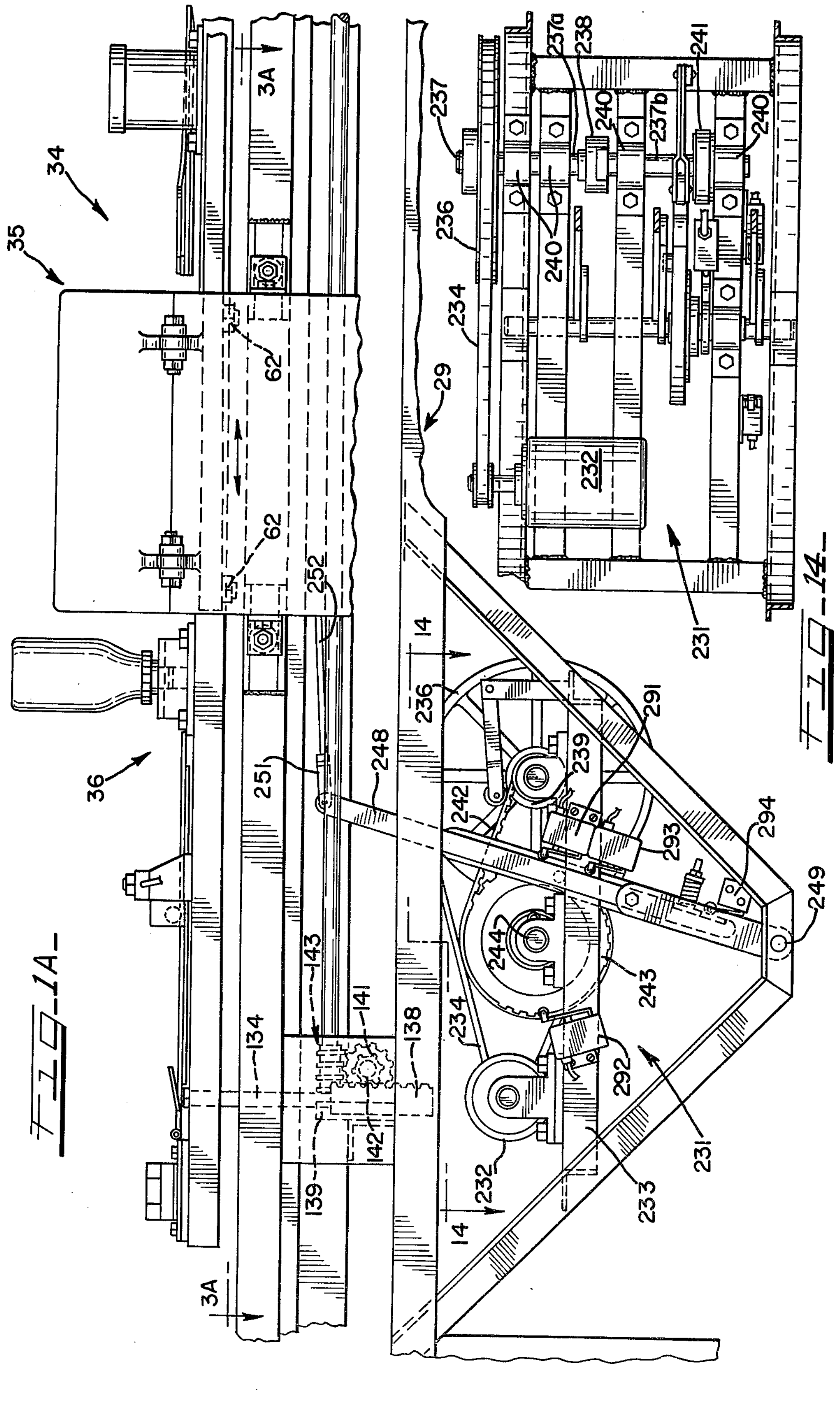
FIG. 14 is a fragmentary view taken on the line 14—14 of FIG. 1A.
Figure 4A:
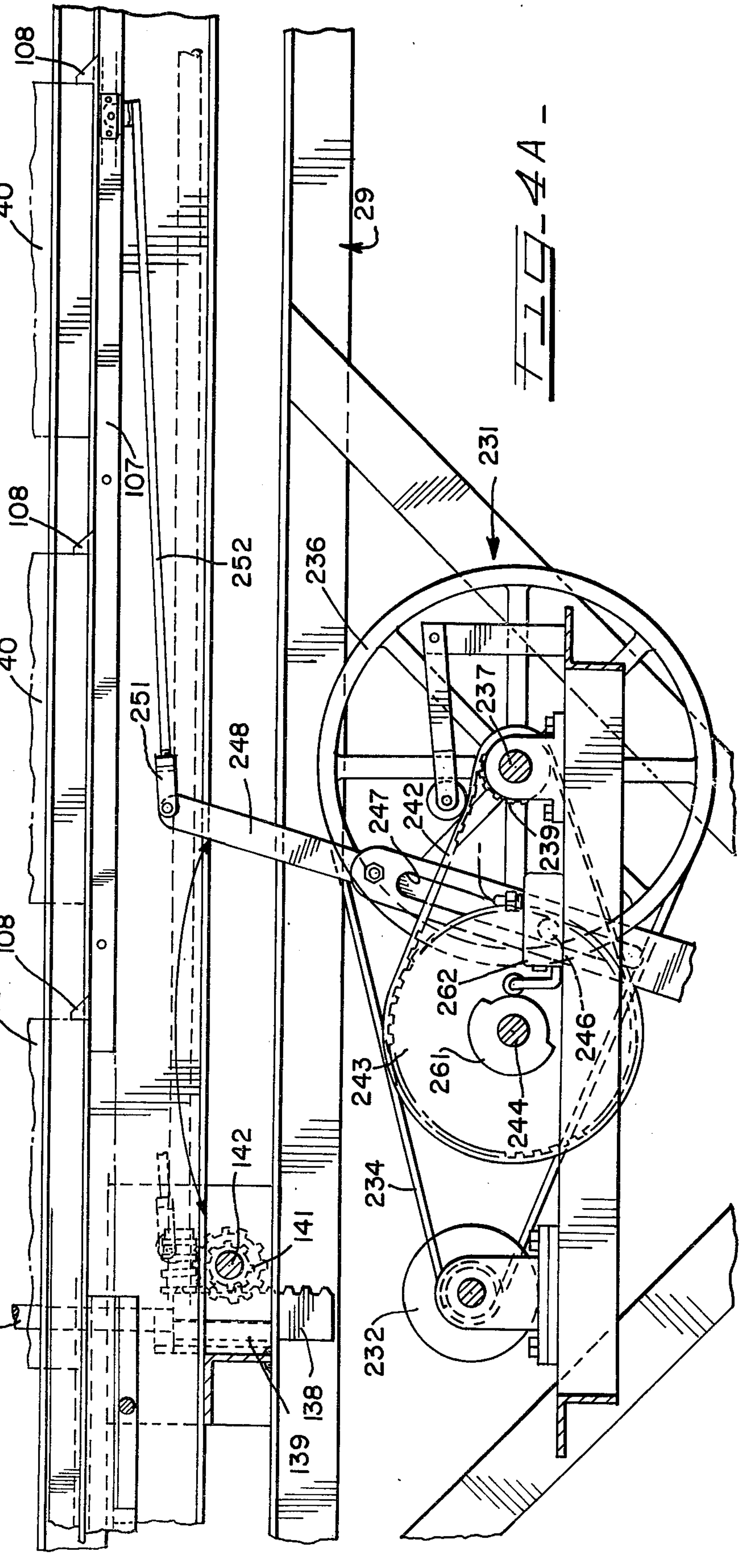

Steady lines of cartons are moved through the three channels 86, 87 and 88 by a drive 231 shown in FIGS. 1A, 4A and 14. The drive 231 is mounted on the frame 29 of the machine generally below the reglueing station 36, and comprises an electric motor 232 secured to a crossbrace 233 of the machine frame. The motor 232 is connected by a belt 234 to a large wheel or pulley 236 that is secured to a laterally extending drive shaft 237. The shaft 237 is segmented and a magnetic clutch 238 is connected between the two segments 237*a* and 237*b*. When the two shaft segments 237*a* and 237*b* are turned together due to engagement of the magnetic clutch 238, a toothed sprocket 239 is turned. When the magnetic clutch 238 is not engaged, the shaft segment 237*b* is held stationary by a magnetic brake 241. The two segments are supported by bearings 240. The toothed sprocket 239 is connected by a toothed belt 242 to another larger toothed sprocket 243 which is fastened to a shaft 244 that is rotatably mounted on the frame. With reference to FIG. 4A, a roller 246 is rotatably mounted on a side of the sprocket 243, and it is positioned in an elongated slot 247 formed in an arm 248. The lower end of the arm 248 is pivotally mounted by a pin 249 (FIG. 1A) on the lower end of the machine frame, and the upper end of the arm 249 is pivotally connected to a yoke 251. As the wheel 243 turns, the roller 246 moves in a circle and slides up and down in the slot 247, and it pivots the arm 248 first from right to left as seen in FIG. 1A and then from left to right again. This type of drive is advantageous in the present machine because, when the wheel 243 is turned in the counterclockwise direction starting from the position shown in FIG. 1A, the arm 248 will pivot toward the left and then slow down gradually, and it will then have a quick return toward the right to the FIG. 1A position.

Figure 16:
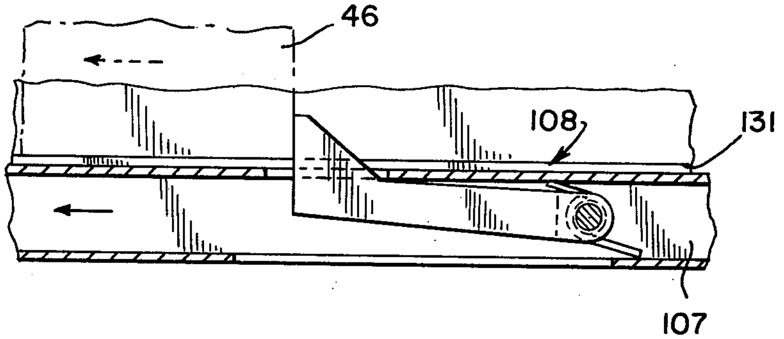
FIG. 16 is an enlarged fragmentary sectional view taken on the line 16—16 of FIG. 3A.
Figure 17:
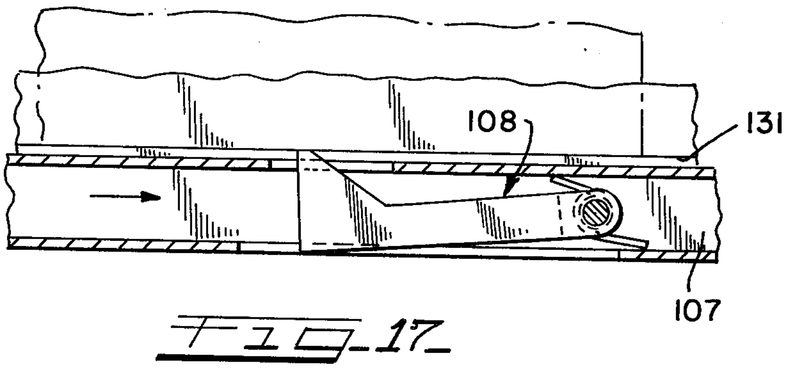
FIG. 17 is a view similar to FIG. 16 but showing different operative positions of some of the parts.

The yoke 251 that is fastened to the upper end of the arm 248 is connected by a link 252 (FIG. 4A) to the three links 107 and the sets of pusher dogs 108 at the stations 32 to 36 of the machine, and to the dogs of the three pusher mechanisms 101, 102 and 103. All of the dogs of the foregoing sets move through slots formed in the bed of the machine and move cyclically to push the groups of cartons from one machine stage to the next. The links 107 are movably mounted on the frame of the machine below the bed 131, and the dogs 108 are constructed and operate similarly to the corresponding parts of the machine shown in U.S. Pat. No. 3,513,618. One of the dogs is illustrated in detail in FIGS. 16 and 17.

The drive 231 further includes a cam 261 fastened to the shaft 244, the cam 261 (FIG. 4A) being located to actuate an air valve 262 that has a follower engaging the outer surface of the cam 261. The air valve 262 controls operation of an air cylinder 263 (FIG. 2) located at the front end of the machine. The air cylinder 263 is secured to the machine frame, and the piston rod 266 of the cylinder is connected to an angle-shaped catch 267 that is pivotally mounted on the frame of the machine. The catch 267 is mounted to swing into the path of the cartons moving on the conveyor 31, as shown in FIG. 2. When the air cylinder 263 is actuated, the piston rod is pulled into the cylinder and the right angle catch 267 is pivoted clockwise from the position shown in FIG. 2 to the position shown in FIGS. 18 and 20. In this position, the catch does not engage any of the cartons moving on the infeed conveyor 31. However, when the air cylinder is not actuated, the piston rod 266 is pushed out of the cylinder and it pivots the catch 267 in the counterclockwise direction as seen in FIG. 2 to the position shown in FIGS. 2, 19, and 21, where the outer end of the catch 267 extends into the path of the cartons moving from the infeed conveyor onto the table 30. The cam 261 is oriented on the shaft 244 to actuate the valve 262 and the air cylinder 263 to swing the catch to the position shown in FIGS. 19 and 21 at the same time that the arm 248 swings and moves the dogs to push the cartons through the channels. The catch 267 of course serves to hold the No. 6 carton in place while the cartons numbered 1, 3, and 5 are being pushed off of the table 30 and into the channels by the dogs 104. For the catch 267 to work satisfactorily, it is of course necessary that the side rail 43 be adjusted to be as close as possible to the other side rail 42.

The operation of the machine in pushing the cartons numbered 1, 3 and 5 into the three channels and in spreading them is illustrated in FIGS. 18, 19, 20 and 21. Assuming that cartons have just been fed onto the infeed conveyor 31, the feed belt 44 pushes the cartons forwardly and the pressure from the cartons on the belt causes the No. 1 carton to engage and actuate the switch 82. The switch 82 is connected in the control circuit of the machine and operates to disengage the magnetic brake 241 and to engage the magnetic clutch 238. Consequently, the wheel 243 is turned causing the arm 248 to swing first to the left and then to the right. When the arm 248 swings toward the left the dogs at the various stations are moved from right to left as seen in FIGS. 1 through 4A, and the cam 261 actuates the air cylinder 263 to swing the catch 267 into the position illustrated in FIGS. 2, 19 and 21. FIG. 19 illustrates the situation where the dogs of the three pusher mechanisms 101, 102 and 103 have pushed the cartons into the three channels, the two separators serving to slant the cartons 1 and 5 outwardly and into the two channels 86 and 88. The center carton No. 3 is of course pushed straight into the center channel 87. The cartons numbered 2 and 4 engage the front ends 96 and 97 of the two separators 92 and 93 and are held against movement at this time. The configuration of the side walls of the separators and the guides 91 and 94 straightens out the two side cartons 1 and 5 as they move to the positions shown in FIG. 19, the dogs of the three pusher mechanisms 101, 102 and 103 moving the three cartons sufficiently far forward that they are ahead of the dogs 108 of the flap opener stage 33. After the wheel 243 has moved about one-half of a revolution and has swung the arm 248 forwardly, the arm 248 is again swung toward the right and the sets of dogs are returned to their initial positions. A limit switch 291 senses the arrival of the arm 248 at the beginning position illustrated in FIGS. 1A and 4A and disengages the magnetic clutch 238 and engages the magnetic brake 241. At this time the catch 263 is again pivoted to the disengaged position shown in FIGS. 18 and 20, and as soon as the catch 267 moves out from the front of carton No. 6, the pressure of the cartons remaining on the feed belt 44 pushes additional cartons onto the table 30. When a full stack of cartons is again on the table 30, the switch 82 is again actuated and the foregoing cycle of events is once again repeated.

To summarize briefly the operation of this machine, the drive motor 232 normally runs continuously and the feed belt 44 is normally turned continuously. For a particular size carton, the side rail 43 is adjusted for the carton length, the carriage is adjusted for the carton height, the stop 71 is adjusted for the carton width, and the rollers 169, 170 and 171 are adjusted for the carton width. When there is a lineup of cartons on the platform 30 and on the conveyor belt, the pressure of the cartons actuates the switch on the stop 91. The clutch 238 is engaged and the arm 248 pivots counterclockwise and sets of three cartons are pushed through the three channels. The three cartons on the platform 30 are properly spaced due to the interleaving cartons numbers 2 and 4. When the arm 248 reaches the leftmost position, the carton movement stops and the arm 248 actuates a switch 292 (FIG. 1A) which causes an iron of the stamp applying station 35 to move down. The arm 248 then swings to the right again and into engagement with switches 291 and 293. Switch 291 disengages the clutch 238 and engages the brake 241, and the switch 293 raises the iron of the stamping stage 35. A safety switch 294 may be provided to turn off the machine if the arm 248 pivots too far. The switches 212 that sense the flaps are connected in the control circuit to prevent the initiation of a machine cycle as described above, unless all of the flaps of a preceding set of three cartons have been opened. The catch 267 holds the cartons on the belt back while three cartons are pushed into the channels, but as soon as the pusher dogs are returned, the platform is again filled with cartons and the above cycle is repeated.

I claim:

1. Apparatus for processing cartons of cigarettes, comprising an input platform adapted to receive a lineup of cartons in side-by-side relation, the cartons being oriented so that the cigarette packages are standing on end and the carton flaps are uppermost, means forming a plurality of parallel, laterally spaced channels, said channels being spaced a distance that is approximately equal to the thickness of said each of said cartons, stop means adjacent said platform for stopping said lineup with alternate cartons substantially in line with said channels, carton feeding means for moving cartons onto said platform and in a direction that is substantially perpendicular to said channels and toward said stop means, means for moving said alternate cartons into said channels, said alternate cartons being spaced due to the interleaving cartons, and separator means between said channels for holding said interleaving cartons.

2. Apparatus as in claim 1, wherein said carton feeding means comprises infeed conveyor means for pushing said cartons on to said input platform, said platform being adapted to contain a predetermined number of cartons, and said stop means including switch means adapted to be actuated when said predetermined number has been moved on to said platform.

3. Apparatus as in claim 2, and further including means between said conveyor means and said platform for holding cartons on said conveyor during operation of said moving means.

4. Apparatus as in claim 1, wherein said stop means includes a switch that is adapted to be actuated when said platform is filled with cartons.

5. Apparatus as in claim 1, wherein three of said channels are provided and said platform is sized to receive five cartons, said stop means being located to place the center of said five cartons substantially in line with the center of said three channels.

6. Apparatus as in claim 5, wherein said moving means pushes the first, third and fifth of said five cartons into said three channels, and said separator means holds the second and fourth cartons.

7. Apparatus as in claim 1, wherein the location of said stop means is adjustable to accommodate cartons of different thicknesses.

8. Apparatus as in claim 3, wherein said holding means is adjustable for cartons of different lengths.

9. Apparatus as in claim 1, wherein each of said channels includes means for opening said carton flaps, and means for vertically adjusting said flap opening means for different height cartons.

10. Apparatus as in claim 9, wherein each of said channels further includes flap sensor means adjacent said flap opener means for sensing said flaps when said flaps are in the vertical positions.

11. Apparatus as in claim 10, wherein each of said sensor means is operable to sense two flaps of a carton.

12. Apparatus for processing cartons of cigarettes, comprising a platform for receiving a lineup of cartons in side-by-side relation, stop means adjacent said platform for engaging said lineup, a plurality of parallel, spaced channels each having an entrance end, the direction of said channels being generally parallel to the long dimension of said cartons and said platform being adjacent said entrance ends of said channels, means for moving a lineup of said cartons generally perpendicular to said direction of said channels and toward said stop means, means for pushing a plurality of cartons from said lineup into said channels, said cartons of said plurality being spaced apart and separated by interleaving cartons of said lineup, and separating means for holding said interleaving cartons.

13. Apparatus as in claim 1, wherein said channels are spaced apart by approximately the thickness of one of said cartons.

14. Apparatus as in claim 13, wherein said platform holds an odd number of cartons, the odd numbered cartons being pushed into said channels and the even numbered cartons being held by said separating means.

* * * * *